Jan. 9, 1945.                T. I. RESS                2,367,139
                         SOUND LENS ADJUSTER
                         Filed Sept. 4, 1943
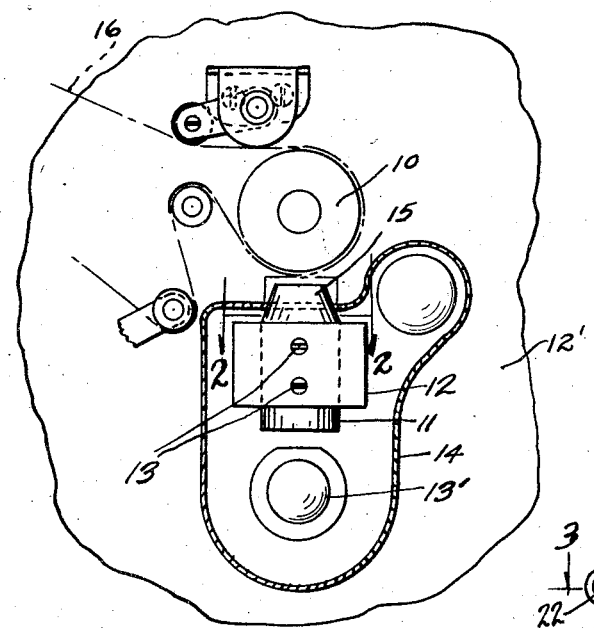
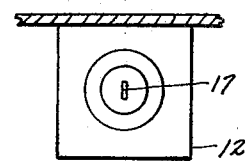
Fig.2
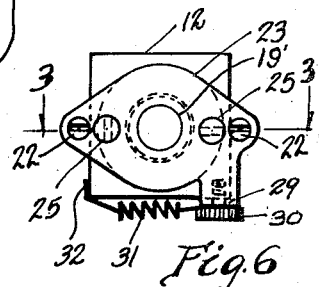
Fig.6
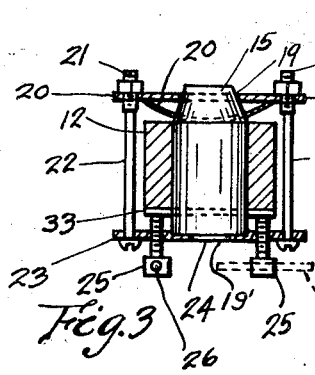
Fig.3
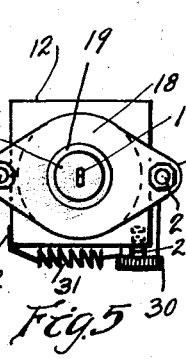
Fig.5
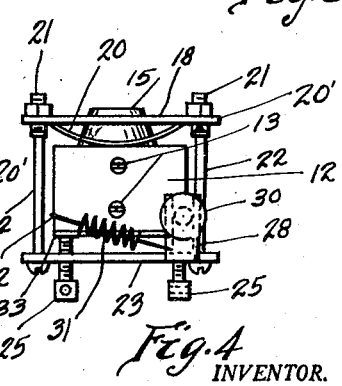
Fig.4
INVENTOR.
Thomas I. Ress
BY
His Attorney Patented Jan. 9, 1945

2,367,139

UNITED STATES PATENT OFFICE 2,367,139

SOUND LENS ADJUSTER

Thomas I. Ress, Chicago, Ill., assignor to De Vry Corporation, Chicago, Ill., a corporation of Illinois Application September 4, 1943, Serial No. 501,247

3 Claims. (Cl. 88—24)

This invention relates to a sound lens adjuster and has for its principal object the provision of an improved construction of this character which will be highly efficient in use and economical in manufacture.

In the art of sound pictures there is employed in the projecting machine what is termed a sound lens.

This lens is mounted in close proximity to what is known as a sound drum. Over the drum and between it and the sound lens is fed the film having thereon the picture and sound track synchronized to the finest degree of exactness for high standards of performance. Associated with this sound lens is an exciter lamp.

In sound lens to which I am now and will hereinafter refer to there is provided in the nose of the lens barrel a relatively narrow and short elongated slit. In practice this slit lines up with exactitude with the sound track. If it does otherwise there would result a displeasing distortion reaching at times a staccato effect.

This lens is usually factory adjusted. By factory adjusted I mean adjusted by the mechanic at the factory before the projector is put into use.

It is therefore one of the many objects of this invention to provide a device for adjusting this sound lens at the factory whereby the above stated objections will be eliminated with the result that upon leaving the factory the lens, if not tampered with, will have a permanent adjustment.

Another object of the invention is the provision of a sound lens adjustment which may be used outside as well as in the factory for the purposes hereintofore recited.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a fragmentary side elevation of a motion picture apparatus illustrating a sound lens associated therewith;

Fig. 2 is a plan view taken substantially on line 2—2 of Fig. 1;

Fig. 3 is a sectional detail view taken substantially on line 3—3 of Fig. 6 showing the lens adjuster mounted upon the lens holding block;

Fig. 4 is a front elevational view of the same;

Fig. 5 is a top plan view of the same; and

Fig. 6 is a bottom plan view of the same.

In the drawing I have shown the preferred form of construction of my invention. My invention is shown associated with a motion picture projecting machine with sound equipment. This machine is of a standard make and in the present instance comprising a sound drum 10, a sound lens barrel 11, the latter mounted in a block 12 and removably connected thereto by screw elements 13, the block 12 being carried by a frame 12' of the motion picture machine.

Associated with this lens barrel 11 is an exciter lamp 13' arranged in a removable housing 14 from which the nose 15 of the lens projects.

Payed over and around the sound drum 10 and between it and the sound lens barrel 11 is a picture film 16 having the usual and conventional sound track (not shown).

The nose 15 of the sound lens barrel 11 has the usual fine and narrow slit 17, (Fig. 2) formed therein.

As before stated it is indispensable that this slit be aligned with exactitude with respect to the sound track for high standards of performance. To assure this my invention is mostly concerned.

In this connection I provide an adjuster comprising a top plate 18. This plate 18 has formed therein a centrally located opening 19 formed therein for the reception of the nose 15 of the sound lens barrel 11. In such position of the lens barrel 11 the plate 18 bears upon the nose 15 thereof.

Between the plate 18 and the block 12 is a spring washer 20 which bears against the plate 18 and tends to force the same upwardly.

The plate 18 provides oppositely arranged ears 20' which receive the shanks 21 of nut bearing bolts 22. These shanks 21 are threaded through the openings formed in the ears 20'.

The bolts 22 are carried by a lower plate 23 similar in construction and design to the plate 18 except that in place of an opening such as 19 there is provided a countersink or recess 24 which receives the lowered portion of the lens barrel 11, and in which plate 23 there is an opening 19' similar to the opening 19.

Carried by the bottom plate 23 are pressure screws 25 each having a transverse opening 26 formed therein for the reception of a rod like tool 27 whereby to effect rotation of these screws for reasons hereinafter set forth. These screws bear against a washer 33 positioned against the bottom of the block 12 (Fig. 3).

Formed on an edge of the bottom plate 23 is an upstanding bifurcated lug 28 through which projects the shank 29 of a finger screw 30 threaded into the block as shown (Fig. 6).

Secured to this lug 29 is one end of a tension spring 31, the other end of such spring being hooked to the block 12 as at 32.

The adjustment of the lens is effected in the following manner.

The lens barrel 11 holding screws 13 are removed and loosened to allow rotation as well as longitudinal movement of the lens barrel 11.

After the spring washer 20 is mounted in place the plate 18 is positioned to embrace the nose of the lens barrel 11. The washer 33 is now mounted to embrace the bottom of the lens barrel 11 after which the plate 23 is arranged in its place by threading the shanks of the screws 22 through the openings of the top plate 18.

The next operation is to thread the shank of the finger screw in place and attach the end of the spring 31 to the lens block as at 32.

In assembly the lens barrel 11 is positioned in the block at a position thought proper for standard operation. Should it be found that the lens barrel 11 is too close to the sound track the same is lowered by manipulating the pressure screws 25, bearing the plate 18 against the sides of the nose of the lens barrel 11 and with the consequent result of moving the lens barrel 11 downward in the block.

Should it develop that the slit 17 is not aligned with the sound tracks, to shift the lens barrel 11 anti-clockwise the finger screw 30 is retracted. This results in the rotation of the barrel in the direction stated, it being noted that the spring washer 20 has gripping relation with the lens barrel 11 for this purpose.

To shift the lens barrel 11 clockwise the screw 30 is projected with the result that the lens barrel 11 with the assistance of the spring 31 will rotate anti-clockwise. Thus an adjustment of a high degree of exactitude may be made to bring the slit 17 of the lens barrel 11 in exact alignment with the sound tracks of the film. After the adjustment the lens barrel 11 is secured in place by the screws 13.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An adjuster for a sound track lens barrel mounted in a supporting block comprising pressure means for moving the barrel in one direction longitudinally of the block, a screw element for rotating the barrel in opposite direction with respect to the block, and a structure for supporting the pressure means and screw element in operative position with respect to the block, said structure comprising a pair of plates, one embracing the top portion of the barrel and the other abutting the bottom thereof, and means for clamping said plates in their respective positions with respect to the barrel.

2. An adjuster for a sound track lens barrel mounted in a supporting block comprising pressure means for moving the barrel in one direction longitudinally of the block, a screw element for rotating the barrel in opposite direction with respect to the block, and a structure for supporting the pressure means and screw element in operative position with respect to the block, said structure comprising a pair of plates, one embracing the top portion of the barrel and the other abutting the bottom thereof, and means for clamping said plates in their respective positions with respect to the barrel, said pressure means and screw element being carried by one of said plates.

3. An adjuster for a sound track lens barrel mounted in a supporting block comprising pressure means for moving the barrel in one direction longitudinally of the block, a screw element for rotating the barrel in opposite direction with respect to the block, and a structure for supporting the pressure means and screw element in operative position with respect to the block, said structure comprising a pair of plates, one embracing the top portion of the barrel and the other abutting the bottom thereof, a spring member having gripping engagement with the barrel, and means for clamping said plates in their respective positions with respect to the barrel with the spring member gripping said barrel.

THOMAS I. RESS.